(12) United States Patent
Stockhammer et al.

(10) Patent No.: US 11,582,125 B2
(45) Date of Patent: Feb. 14, 2023

(54) REPAIR MECHANISM FOR ADAPTIVE BIT RATE MULTICAST

(71) Applicant: QUALCOMM Incorporated, San Diego, CA (US)

(72) Inventors: Thomas Stockhammer, Bergen (DE); Waqar Zia, Munich (DE); Imed Bouazizi, Frisco, TX (US)

(73) Assignee: QUALCOMM INCORPORATED, San Diego, CA (US)

( * ) Notice: Subject to any disclaimer, the term of this patent is extended or adjusted under 35 U.S.C. 154(b) by 206 days.

(21) Appl. No.: 17/039,442

(22) Filed: Sep. 30, 2020

(65) Prior Publication Data

US 2021/0099371 A1    Apr. 1, 2021

Related U.S. Application Data

(60) Provisional application No. 62/908,949, filed on Oct. 1, 2019.

(51) Int. Cl.
*H04L 43/0829*    (2022.01)
*H04L 1/08*    (2006.01)
*H04L 67/02*    (2022.01)

(52) U.S. Cl.
CPC ............ *H04L 43/0835* (2013.01); *H04L 1/08* (2013.01); *H04L 67/02* (2013.01)

(58) Field of Classification Search
CPC ....... H04L 1/08; H04L 43/0835; H04L 67/02; H04L 69/22; H04L 43/087; H04N 21/234; H04N 21/64322; H04N 21/8456
See application file for complete search history.

(56) References Cited

U.S. PATENT DOCUMENTS

2008/0313191 A1* 12/2008 Bouazizi ............. H04L 12/1863
2014/0095592 A1*  4/2014 Hartrick ................. H04L 67/01
                                                             709/203

(Continued)

FOREIGN PATENT DOCUMENTS

WO    2013067219 A2    5/2013
WO    2019121963 A1    6/2019

OTHER PUBLICATIONS

International Search Report and Written Opinion—PCT/US2020/053766—ISA/EPO—dated Jan. 14, 2021—12 pp.

(Continued)

*Primary Examiner* — Dung B Huynh
(74) *Attorney, Agent, or Firm* — Shumaker & Sieffert, P.A.

(57) ABSTRACT

An example device for retrieving media data includes a memory configured to store media data; and one or more processors implemented in circuitry and configured to: receive data indicating a packet loss signaling mechanism, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header; detect loss of a packet using the at least one of the packet loss signaling mechanisms, the lost packet including missing media data; generate a byte range request for the missing media data using information of the file delivery header; and deliver a proper media object to a media application.

39 Claims, 6 Drawing Sheets

(56) References Cited

U.S. PATENT DOCUMENTS

| | | | | |
|---|---|---|---|---|
| 2014/0307734 | A1* | 10/2014 | Luby | H04L 12/18 |
| | | | | 370/390 |
| 2016/0182598 | A1* | 6/2016 | Cossa | H04L 65/611 |
| | | | | 370/252 |
| 2016/0261677 | A1* | 9/2016 | Lotfallah | H04L 67/02 |
| 2016/0286457 | A1* | 9/2016 | O'Hare | H04W 24/02 |
| 2016/0323348 | A1* | 11/2016 | Bradbury | H04L 67/02 |
| 2017/0055046 | A1* | 2/2017 | Lee | H04N 21/4347 |
| 2019/0173935 | A1* | 6/2019 | Loh | H04N 21/4223 |
| 2019/0238390 | A1* | 8/2019 | Martin | H04L 65/612 |
| 2019/0297135 | A1* | 9/2019 | Basra | H04L 43/0823 |
| 2020/0077161 | A1* | 3/2020 | Loh | H04N 21/8456 |
| 2022/0006723 | A1* | 1/2022 | Debenedetti | H04L 45/121 |

OTHER PUBLICATIONS

Akamai et al., "Low-Latency Modes for Dash", DASH-IF IOP, V4.3, Change Request, Jun. 28, 2019, 24 Pages.

DVB: "Adaptive Media Streaming Over IP Multicast", DVB Document A176 (Second Edition), Mar. 2020, pp. 1-110.

ETSI TS 126 346, "Universal Mobile Telecommunications System (UMTS), LTE, Multimedia Broadcast/Multicast Service (MBMS), Protocols and Codecs (3GPP TS 26.346 version 14.8.0 Release 14)", V14.8.0, Jan. 2019, 278 Pages.

Fielding R., et al., "Hypertext Transfer Protocol—HTTP/1.1", Network Working Group, Request for Comments, RFC 2616, Standards Track, Jun. 1999, pp. 1-114.

Fielding R., et al., "Hypertext Transfer Protocol (HTTP/1.1): Semantics and Content", Internet Engineering Task Force (IETF), RFC 7231, Obsoletes 2616, Updates 2817, Standards Track, Jun. 2014, pp. 1-101.

ITU-T H.264, Series H: Audiovisual and Multimedia Systems, Infrastructure of Audiovisual Services—Coding of Moving Video, Advanced Video Coding for Generic Audiovisual Services, The International Telecommunication Union, Jun. 2011, 674 Pages.

Paila T., et al., "FLUTE—File Delivery Over Unidirectional Transport", FLUTE—File Delivery over Unidirectional Transport, rfc6726. txt, Internet Engineering Task Force (IETF), Standard Track, Internet Society (ISOC) 4, Rue Des Falaises CH-1205 Geneva, Switzerland, Nov. 6, 2012 (Nov. 6, 2012), XP015086468, pp. 1-46, http://tools.ietf.org/html/rfc6726, [retrieved on Nov. 6, 2012], p. 3, line 30—p. 27, line 12.

* cited by examiner

REPAIR MECHANISM FOR ADAPTIVE BIT RATE MULTICAST

This application claims the benefit of U.S. Provisional Application No. 62/908,949, filed Oct. 1, 2019, the entire contents of which are hereby incorporated by reference.

TECHNICAL FIELD

This disclosure relates to transport of media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof.

SUMMARY

In general, this disclosure describes techniques for detecting packet losses and retrieving lost media data. In particular, according to the techniques of this disclosure, a server device may signal a packet loss signaling mechanism to be used by a client device to detect packet loss for a streamed media bitstream. The packet loss signaling mechanism may be one or more of that segments are sent in chunks, that transport object identifiers (TOIs) are sequential, or that a last packet of an object assigned to a TOI has a specific flag set in a header of the last packet, a base uniform resource locator (URL), a maximum latency, or a synchronization point in a file delivery header. The client device may use the packet loss signaling mechanism(s) to detect a lost packet in the streamed media bitstream. In response to detecting a lost packet, the client device may retrieve some or all missing media data of the lost packet using a byte range request specifying a portion of a media file (e.g., a segment) including the media data included in the lost packet. In this manner, the client device may obtain a proper media object, where the proper media object may still be missing some of the missing media data, but formatted such that the proper media object can be properly parsed, decoded, and presented.

In one example, a method of retrieving media data includes receiving data indicating a packet loss signaling mechanism, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header; detecting loss of a packet using at least one of the packet loss signaling mechanisms, the lost packet including missing media data; generating a byte range request for the missing media data using information of the file delivery header; and delivering a proper media object to a media application.

In another example, a device for retrieving media data includes a memory configured to store media data; and one or more processors implemented in circuitry and configured to: receive data indicating a packet loss signaling mechanism, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header; detect loss of a packet using at least one of the packet loss signaling mechanisms, the lost packet including missing media data; generate a byte range request for the missing media data using information of the file delivery header; and deliver a proper media object to a media application.

In another example, a computer-readable storage medium has stored thereon instructions that, when executed, cause a processor to receive data indicating a packet loss signaling mechanism, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header; detect loss of a packet using at least one of the packet loss signaling mechanisms, the lost packet including missing media data; generate a byte range request for the missing media data using information of the file delivery header; and deliver a proper media object to a media application.

In another example, a device for retrieving media data includes means for receiving data indicating a packet loss signaling mechanism, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header; means for detecting loss of a packet using at least one of the packet loss signaling mechanisms, the lost packet including missing media data; means for generating a byte range request for the missing media data using information of the file delivery header; and means for delivering a proper media object to a media application.

In another example, a method of sending media data includes sending data indicating a packet loss signaling mechanism, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header; sending one or more packets including media data via a broadcast or multicast protocol; receiving a byte range request via a unicast protocol from a client device indicating media data of one of the packets that is lost; and in response to the byte range request, sending the media data of the byte range to the client device via the unicast protocol.

In another example, a device for sending media data includes a memory configured to store video data; and one or more processors implemented in circuitry and configured to: send data indicating a packet loss signaling mechanism, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header; send one or more packets including media data via a broadcast or multicast protocol; receive a byte range request via a unicast protocol from a client device indicating media data of one of the packets that is lost; and in response to the byte range request, send the media data of the byte range to the client device via the unicast protocol.

In another example, a computer-readable storage medium has stored thereon instructions that, when executed, cause a processor to send data indicating a packet loss signaling mechanism, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header; send one or more packets including media data via a broadcast or multicast protocol; receive a byte range request via a unicast protocol from a client device indicating media data of one of the packets that is lost; and in response to the byte range request, send the media data of the byte range to the client device via the unicast protocol.

In another example, a device for sending media data includes means for sending data indicating a packet loss signaling mechanism, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header; means for sending one or more packets including media data via a broadcast or multicast protocol; means for receiving a byte range request via a unicast protocol from a client device indicating media data of one of the packets that is lost; and means for sending, in response to the byte range request, the media data of the byte range to the client device via the unicast protocol.

The details of one or more examples are set forth in the accompanying drawings and the description below. Other features, objects, and advantages will be apparent from the description and drawings, and from the claims.

DETAILED DESCRIPTION

Figure 1:
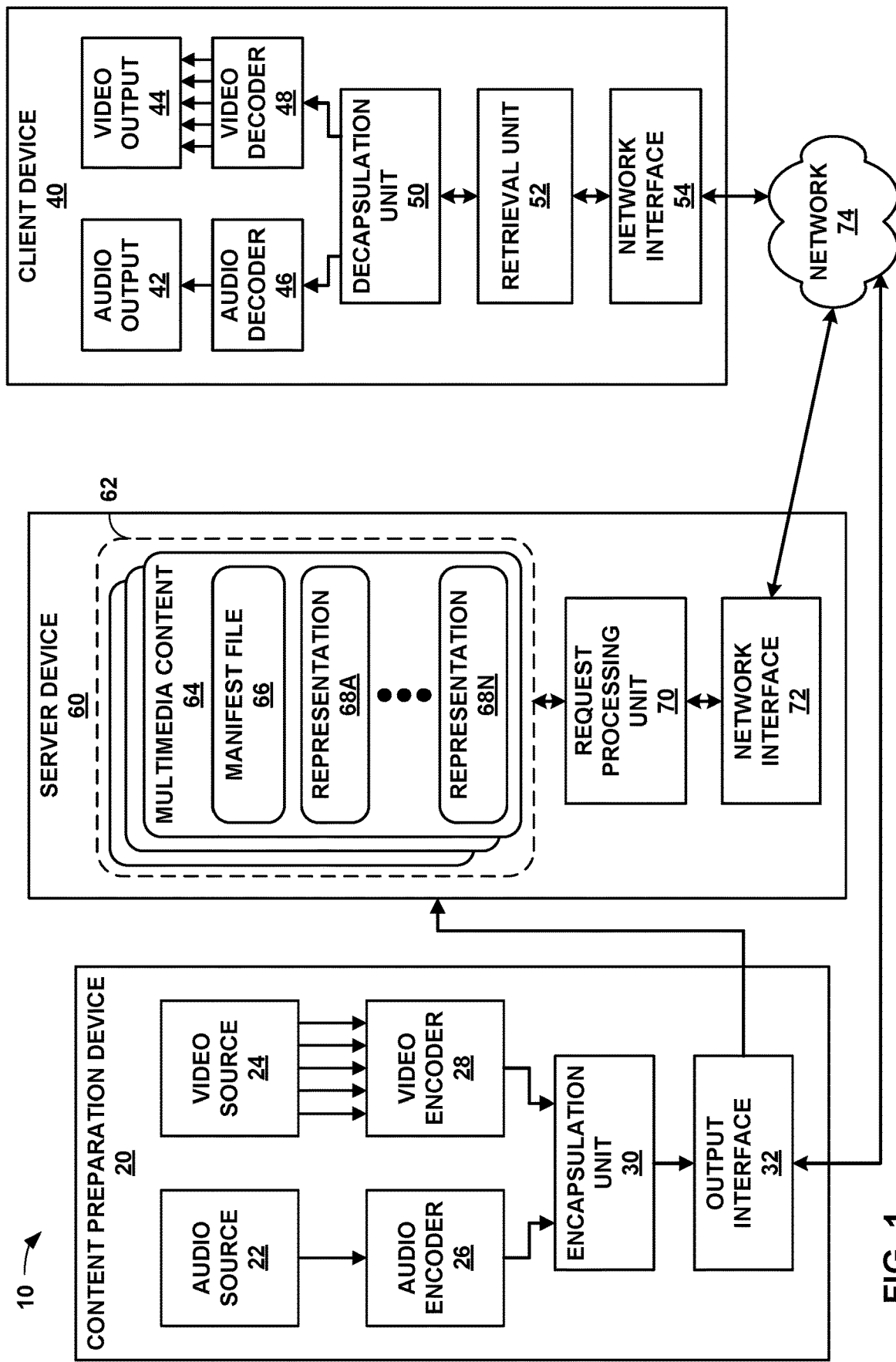
FIG. 1 is a block diagram illustrating an example system that implements techniques for streaming media data over a network.

Unidirectional content delivery protocols like File Delivery over Unidirectional Transport (FLUTE), described in T. Paila et al., "FLUTE—File Delivery over Unidirectional Transport," Network Working Group, RFC 6726, November 2012, available at tools.ietf.org/html/rfc6726, and ROUTE specify various mechanisms for the detection of packet loss on various levels of a multicast protocol. This loss detection enables triggering of a repair procedure so that the entire transport object is not lost due to loss of a packet. The repair is typically initiated as a byte range request, and hence, the receiver needs to have sufficient information in order to initiate such a request.

The procedure may be setup as follows. The sender provides information (e.g., required information) in the content delivery protocol setup and in the individual packets in order to identify the lost packets and to enable repair procedures. The receiver uses the information to either repair the information by, typically, unicast byte range requests or, if those are not available or unsuccessful, or are late, then the loss may be signaled though the HTTP interface.

Loss detection signaling mechanisms may include the following. On the lowest level, detection of a lost packet may be enabled by signaling directly in the header of the transport packet. For example, in ROUTE, when a mode is used for which the objects as well as the packets within the objects are sent in sequence order, a start_offset field and a B-flag, EXT_TOL LCT extension header, and a transport object identifier (TOI) field in the LCT packet header can be used. The start_offset field indicates the starting byte position of the data in the current packet, relative to the first byte of the delivery object. Here the packets are made up of contiguous data portions of the delivery object. Hence, a receiver, upon receiving a packet with start_offset which is not consistent with the start_offset and the size of the payload of last packet, can detect a lost packet. The b-flag may be set in the last packet of a delivery object. This, in conjunction with the EXT_TOL LCT header extension (which signals the length of a transport object) and/or the TOI field, can be used to detect loss of a packet. For example, the start of reception of packets with a new TOI without receiving a packet with a set B flag may indicate lost packets.

Repair signaling mechanisms may include the following. In ROUTE, as indicated above, start_offset and size of packet can be used to determine the missing byte range in the delivery object. So, for a missing packet j following a received packet i and preceding a received packet k, the byte range of missing data is "Missing data byte range=start_offset(i)+size(i) to start_offset(k)−1." If the missing packet is the last packet of the delivery object, then the exact size cannot be determined in this way and the receiver would have to request all bytes until the end of the delivery object.

Both FLUTE and ROUTE provide an expiry time mechanism for the file delivery table (FDT) and enhanced FDT (EFDT) instance, respectively. This also implicitly signals that a multicast packet signaled by this FDT or EFDT instance may not be expected after the above timeout. Signaling Alternate-Content-Location-1 and Alternate-Content-Location-2 elements in FDT/EFDT enable the gateway to find the location for accessing the same object via unicast. The object metadata expiry timeout in the FDT/EFDT instance may also be signaled in a control plane in the service/session metadata signaling, in conjunction or instead of the signaling discussed above. The control plane my carry a base URL to enable the reconstruction of the location of the same content via unicast.

Signaling between a multicast gateway and DASH player may include the following. In a case when the multicast gateway cannot ensure the delivery of error-free content to the DASH player, special signaling may be needed between the multicast gateway and DASH player to handle such a case.

According to TS26.346, clause 7.9.2, a streaming application can accept partial files. An application using HTTP GET requests to retrieve files may include in an HTTP GET request, an 'Accept' request header as defined in RFC 7231, along with a new 3GPP-defined media type 'application/3gpp-partial'. An application using HTTP GET requests to retrieve files may include in the GET request, the 'Accept' request header as defined in RFC 7231, along with a new 3GPP-defined media type 'application/3gpp-partial'. By providing this header and issuing such a partial-file-accept request, the application signals that it is capable of receiving partial file responses.

An example of the use of such an Accept header is:
Accept: */*, application/3gpp-partial In this example, the application indicates that it will accept all media types in the response, as well as the specific "incomplete" type designated by application/3gpp-partial.

If the MBMS client receives a regular HTTP GET request that includes the 'Accept' request along with media type application/3gpp-partial', i.e., a partial-file-accept request, and the MBMS client has received a partial file with at least one byte, then the MBMS client may respond with a partial file response defined as follows according to TS26.346:

The response code is set to 200 OK

The Content-Type header shall be set to application/3gpp-partial.

The message body is a multipart message body and may be the same format as the multipart/byteranges media type as described in RFC 7233, Annex A. The multipart/byteranges media type includes one or more body parts, each with its own Content-Type and Content-Range fields as the means to convey the byte range(s) of the partial file being returned. Each Content-Type header is be set to the value of the Content-Type provided in the FDT Instance for this file. An extension header may be added (e.g., 3gpp-access-position) providing a byte position at which the handler of assigned to the Content-Type of the file may access the file. The value may be created from the mbms2015: IndependentUnitPositions, if present.

A cache directive should be included in the response to prevent any intermediate proxies from storing an incomplete file and serving it to another application. Examples for such a cache directive are "Cache-Control: max-age=0" or "Cache-Control: no-cache."

If the MBMS client receives a partial-file-accept request, and the MBMS client has received a partial file with no bytes (i.e., only the FDT Instance describing the file metadata is received), then the MBMS client may respond with a partial file response defined as follows:

The response code is set to 416 Requested Range Not Satisfiable

The Content-Type header is set to the value of the Content-Type provided in the FDT Instance for this file.

The Content-Range is set to bytes */Content-Length with Content-Length the value of the attribute Content-Length provided in the FDT Instance for this file.

An example for this is provided in TS26.346, clause 7.9.2.3.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In accordance with the techniques of this disclosure, server device 60 (or content preparation device 20) may signal a packet loss detection mechanism to client device 40. For example, server device 60 may signal the packet loss detection mechanism via a control channel between server device 60 and client device 40. The packet loss detection mechanism may include one or more of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header.

Client device 40 may then perform the signaled packet loss detection mechanism(s) to determine whether packets in a broadcast or multicast stream from server device 60 have been lost. In response to determining that one or more packets have been lost, retrieval unit 52 may form one or more byte range requests (i.e., HTTP partial Get requests) specifying byte range(s) of segments including the media data of the lost packets. Retrieval unit 52 may then submit these byte range requests to server device 60 to attempt to retrieve the lost media data via a unicast protocol, e.g., HTTP.

In some examples, server device 60 may signal an inter-packet timeout value. Client device 40 (and in particular, retrieval unit 52) may use the inter-packet timeout value to determine whether a packet has been lost, e.g., if a packet has not been received within an inter-packet timeout interval since receipt of a previous packet of the media stream. The inter-packet timeout value may correspond to a nominal common media application format (CMAF) chunk duration. Server device 60 may signal the inter-packet timeout value in, e.g., a file delivery table (FDT), an enhanced FDT (eFDT), or in a control plane service or session metadata. Thus, client device 40 may extract the inter-packet timeout value from this data.

Whether or not the lost media data is received, retrieval unit 52 may form a proper media object to be delivered to decapsulation unit 50 and, ultimately, audio decoder 46 and/or video decoder 48. The proper media object may generally be parseable and decodable by decapsulation unit 50, audio decoder 46, and video decoder 48. The proper media object may still be missing some of the media data of the lost packet(s), but nevertheless parseable and decodable.

Figure 2:
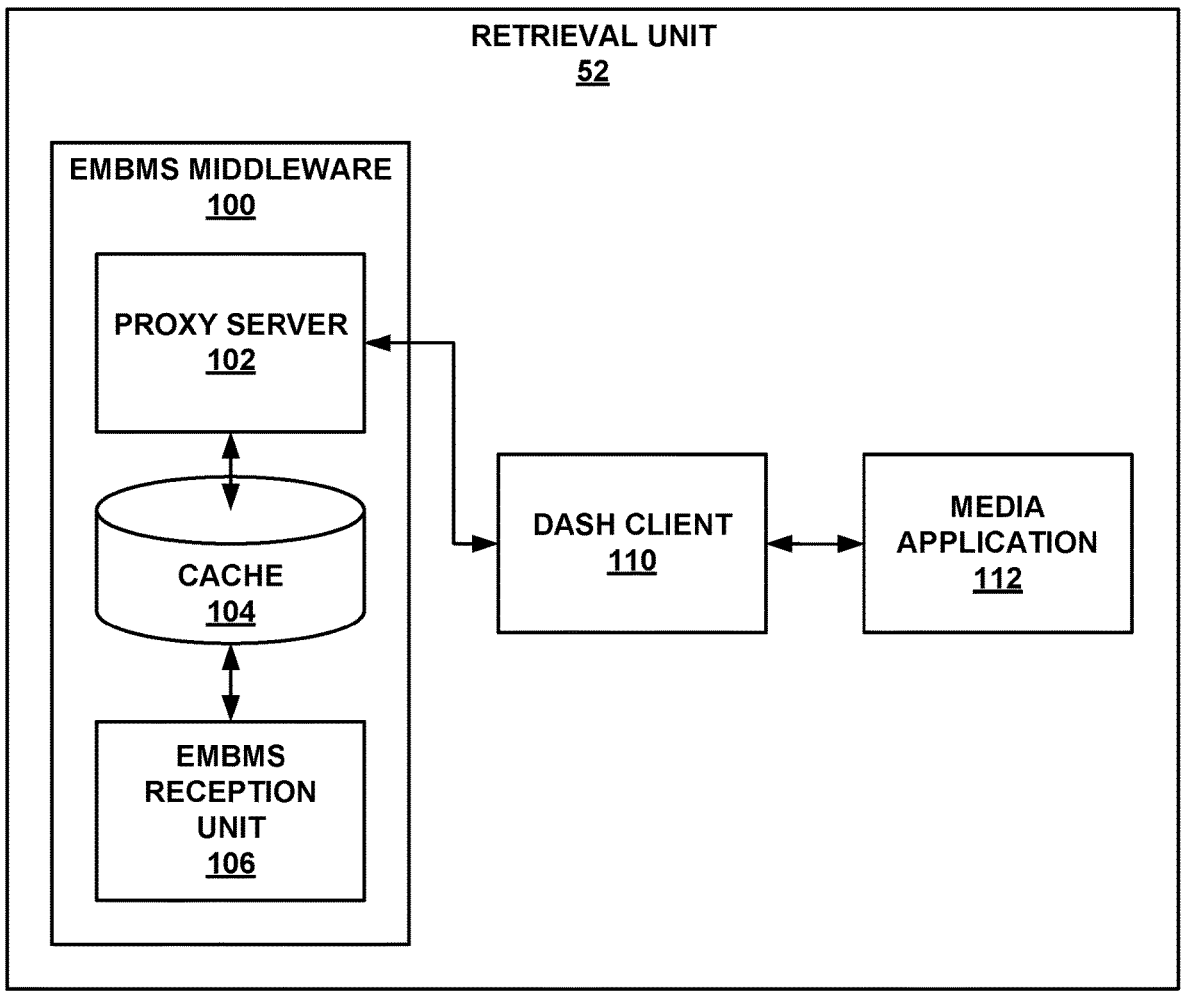
FIG. 2 is a block diagram illustrating an example set of components of a retrieval unit of a client device.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to FLUTE. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

Figure 3:
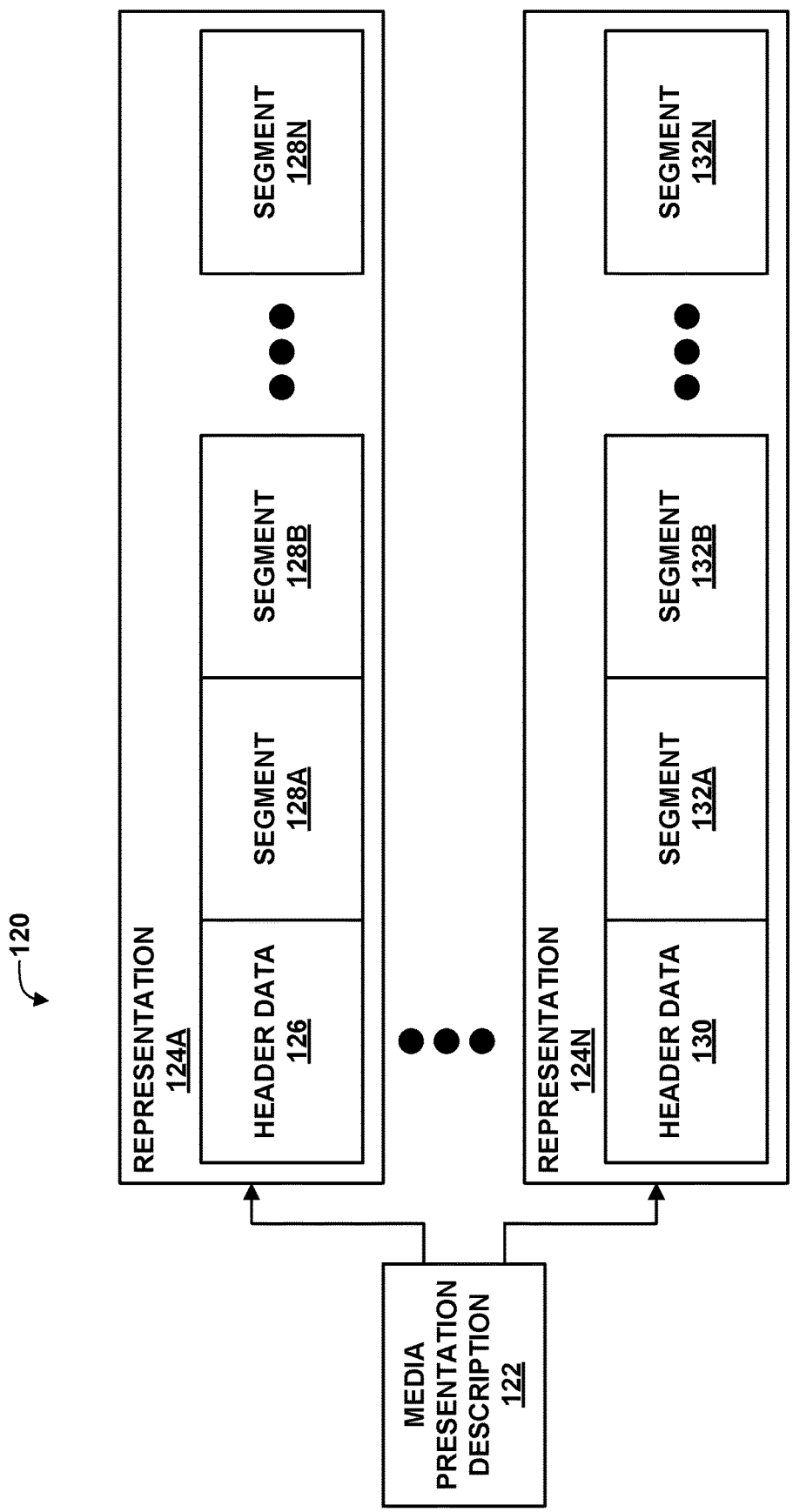
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
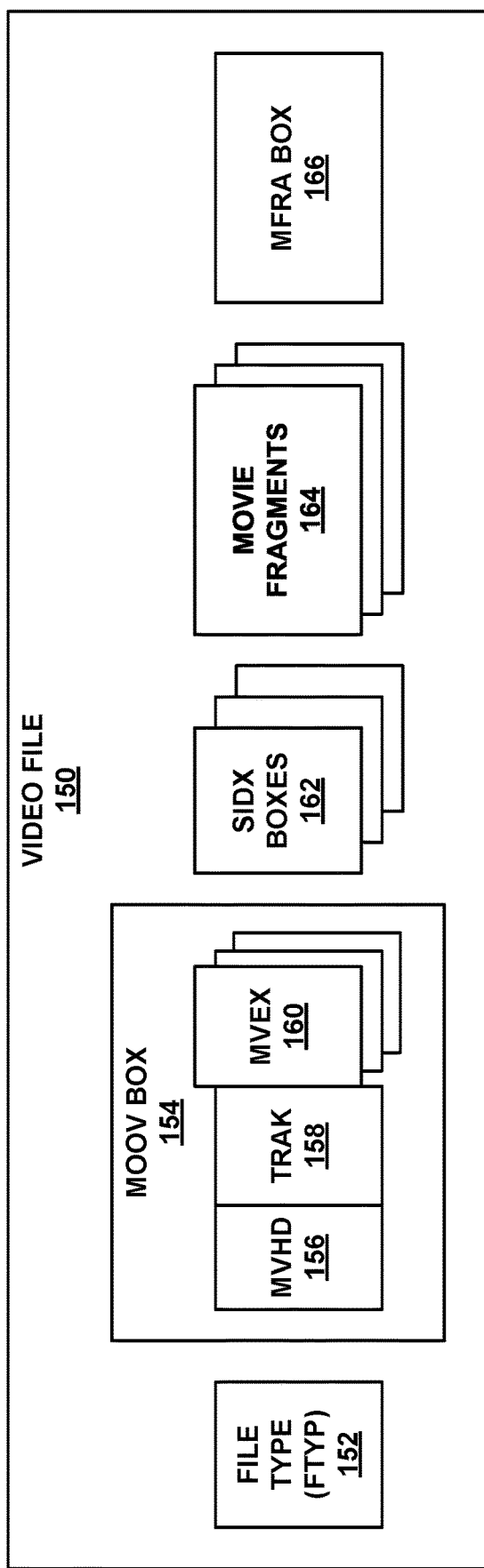
FIG. 4 is a block diagram illustrating elements of an example video file, which may correspond to a segment.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
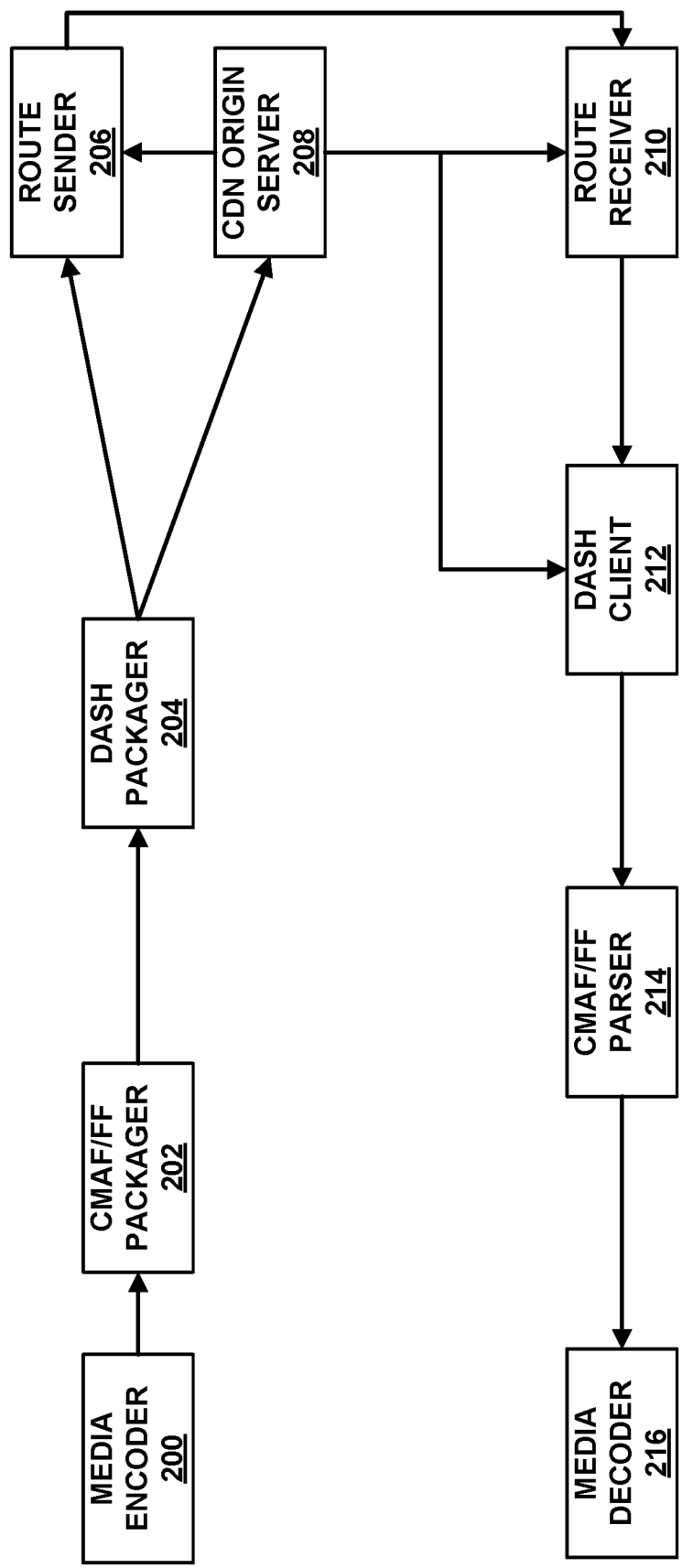
FIG. 5 is a conceptual diagram illustrating an example system including a sender and a receiver according to the techniques of this disclosure.

FIG. 5 is a conceptual diagram illustrating an example system including a sender and a receiver according to the techniques of this disclosure. The sender of FIG. 5 generally includes media encoder 200, CMAF/file format (FF) packager 202, DASH packager 204, ROUTE sender 206, and CDN origin server 208. Media encoder 200 encodes media data, such as audio or video data. Media encoder 200 may correspond to audio encoder 26 or video encoder 28 of FIG. 1. CMAF/FF packager 202 and DASH packager 204 may correspond to encapsulation unit 30 of FIG. 1. ROUTE sender 206 and CDN origin server 208 may correspond to request processing unit 70 and server device 60 of FIG. 1.

The receiver of FIG. 5 generally includes ROUTE receiver 210, DASH client 212, CMAF/FF parser 214, and media decoder 216. ROUTE receiver 210 and DASH client 212 may correspond to retrieval unit 52 of FIG. 1. CMAF/FF parser 214 may correspond to decapsulation unit 50 of FIG. 1. Media decoder 216 may correspond to either or both of audio decoder 46 and video decoder 48.

Media encoder 200 provides encoded media data to CMAF/FF packager 202, which formats the encoded media data into files according to CMAF and a particular file format, such as ISO BMFF or an extension thereof. CMAF/FF packager 202 provides these files (e.g., chunks) to DASH packager 204, which aggregates the files/chunks into DASH segments. DASH packager 204 may also form a manifest file, such as an MPD, including data describing the files/chunks/segments. In addition, according to the techniques of this disclosure, ROTUE sender 206 and/or CDN origin server 208 may signal one or more packet loss detection mechanisms to be used by, e.g., ROUTE receiver 210 and/or DASH client 212 to detect packet loss.

DASH packager 204 provides the segments to ROUTE sender 206 and to CDN origin server 208, along with the MPD. ROUTE sender 206 and CDN origin server 208 may correspond to server device 60 of FIG. 1 or CDN 220 of FIG. 5. In general, ROUTE sender 206 may send media data to ROUTE receiver 210 according to ROUTE, in this example. In other examples, other file-based delivery protocols may be used for broadcast or multicast, such as FLUTE. Additionally or alternatively, CDN origin server 208 may send the media data to ROUTE receiver 210 and/or directly to DASH client 212, e.g., according to HTTP.

ROUTE receiver 210 may be implemented in middleware, such as eMBMS middleware unit 100 of FIG. 2. ROUTE receiver 210 may buffer received media data, e.g., in cache 104 as shown in FIG. 2. DASH client 212 (which may correspond to DASH client 110 of FIG. 2) may retrieve the cached media data from ROUTE receiver 210 using HTTP. Alternatively, DASH client 212 may retrieve media data directly from CDN origin server 208, according to HTTP, as discussed above.

Furthermore, in accordance with the techniques of this disclosure, ROUTE receiver 210, for example, may use the one or more signaled packet loss detection mechanisms to determine that packet loss has occurred, e.g., during a broadcast or multicast streaming session of media data. In response, ROUTE receiver 210 may provide data to DASH client 212 indicating that the packet loss has occurred. Additionally or alternatively, DASH client 212 may determine that the packet loss has occurred using one or more of the signaled packet loss detection mechanisms. In either case, DASH client 212 may form a byte range request, e.g., using an HTTP partial Get request, to retrieve media data corresponding to media data included in the lost packet from CDN origin server 208. In this manner, the receiver of FIG. 5 may generally receive media data via broadcast or multicast, but when part of the media data is lost, DASH client 212 may retrieve the lost media data using unicast, e.g., HTTP.

This disclosure primarily focuses on ROUTE sending to signal properties on how data is distributed, as well as on the interface from ROUTE receiver 210 to DASH client 212 for the case when media data may be partially lost.

The current digital video broadcasting (DVB) adaptive bit rate (ABR) specification enables multicast delivery in a low-latency mode, while conventional mechanisms described above are not tailored for this low-latency mode, which gives rise to their limitations. These limitations my cause an undesired stall of playback, especially in the case of a low latency stream.

| Clause 4 | TM-IPI3251r8: ABR Multicast Taskforce - Reference architecture (figures) |
|---|---|
| Clause 6 | TM-IPI3583r5: TS_ABR-Multicast-task-force_modeOfOperation |
| Clause 8 | TM-IPI3632r1: ABR Multicast taskforce - Data plane draft specification |
| Clause 9 | TM-IPI3626r4: ABR Multicast taskforce - Unicast repair draft specification |
| Clause 11 | TM-IPI3618r6: ABR Multicast taskforce - Control plane draft specification |
| Annex X | TM-IPI3458r20: ROUTE Profile for Linear Live TV Delivery of DASH |
| Annex Y | TM-IPI3463r17: Interface M Operations and FLUTE Profile |

This disclosure recognizes certain issues that may arise with conventional techniques, as discussed below.

The mechanisms in clauses 1.3 and 1.4 of the DVB ABR specification may only work to detect a loss, at the earliest, after a nominal reception duration of a whole delivery object at the receiver side. For example, for multicasting a DASH representation with a nominal segment duration of 2 seconds, this detection would happen, at the earliest, two seconds after the start of reception of an object. This may lead to a significantly long playback stall due to a loss of packet.

The mechanisms of clause 1.2 of the DVB ABR specification may only work after a reception of a subsequent packet (a packet received after a lost packet). Such a reception typically is delayed for a long time, for example, under bad channel conditions where packet reception stops suddenly and for a long period of time. Under this case, the receiver defaults to the mechanisms of clauses 1.3. and 1.4.

The mechanisms in clause 1.2 of the DVB ABR specification are also not robust against an out-of-order packet delivery.

The mechanisms in clause 1.5 of the DVB ABR specification are only defined for full object reception, but not for low-latency cases.

Hence overall, according to clause 1.3 of the DVB ABR specification, using conventional mechanisms, the earliest detection of a packet loss is typically done after a time which is of the order of a nominal DASH segment duration.

This disclosure describes techniques that may address the issues discussed above. A sender and receiver, such as source device 60 and client device 40, may signal data on a control channel, as follows:
1. Signal in the control channel that segments are sent in chunks. Once a chunk is completed at the sender, the sending starts. This means that the sending signaling can be abstracted to indicate that the interval in between sending two packets is at most a certain duration (this signal can be added in the setup when the chunk duration is determined). The sending interval may be at most the chunk duration.
2. Signal in the control channel that TOIs are sequential.
3. Signal on the control channel that the last packet of an object assigned to a TOI has a specific flag set in the packet header.
4. Signal in the control channel a template base URL that permits, based on the TOI of the received FLUTE/ROUTE object, generation of a URL where the same object can be requested in unicast through HTTP.
5. Signal a maximum latency for the packets until they are provided to the application client, even if they are partial.
6. Signaling an ISO BMFF sync point on byte range level on the ROUTE header, i.e., a chunk boundary.

Client device 40 of FIG. 1, ROUTE receiver 210, or other receivers may make use of the signaled information in order to:
1. Detect the loss of one or several packets on the delivery early enough by one or more of the signaling mechanisms.
2. Generate a proper byte range request for the missing data using the information in the ROUTE/FLUTE header, i.e., the TOI and the start_offset.
3. Deliver to the application client (e.g., DASH client 110 or media application 112 of FIG. 2) a proper object in time.
   a. Either the gateway breaks the transfer with e.g., HTTP 504 code, and the DASH player is catered to handle such event. Or,
   b. A response is sent even if it is partial. The partial response includes the byte ranges of the correctly received object as well as resync points on byte stream level.

An application (e.g., media application 112 of FIG. 2) may make use of this information in order to present the best quality by using all usable information received in time. The application may accept partial data with resync points.

Chunk duration signaling details may include the following. The early detection of a loss of a transport packet may be enabled by signaling of an inter-packet timeout. Such a timeout may be set according to the nominal CMAF chunk duration of a stream being transported. The signaling may be done in the multicast transport packet header, or in the multicast object metadata (FDT/eFDT), or in the control plane (service/session metadata). The signaling may take into account the maximum expected packet arrival jitter. In the case that the signaling does not take this into account, the receiver implementation may use its experienced packet reception jitter. The receiver (e.g., client device 40), upon expiry of the inter-packet timeout above, may then request the data via unicast, to ensure that the playback is minimally stalled. As the receiver only determines the start of the byte range it needs to request, and not how much data it needs, it may get data via HTTP chunked mode, where it may request a reasonably large amount of data (e.g., nominal segment size) and can cancel the reception once multicast reception resumes.

This solution in general may enable detection of a packet loss in a time duration on the order of a CMAF chunk duration, e.g., 100-200 msec, vs. state of the art, which may take approximately one to two seconds for such a detection. Such an early detection may enable triggering of an early repair attempt, minimizing the duration of a stall in such a case.

In some examples, DASH client 212 may make a byte range request to repair transport packet loss. After detection of packet loss as discussed above, DASH client 212 may form a unicast byte range request. The byte range determination of the missing data is discussed above. The mechanism for retrieving the address of repair data is documented in the DVB working draft clause 9, TM-IPI3626r4: ABR Multicast taskforce—Unicast repair draft specification, available at www.dvb.org/resources/restricted/members/documents/TM-IPI/ABR%20Multicast/TM-IPI3626r4_ABR-Multicast-taskforce—Unicast-repair-draft-specification.docx.

DASH client 212 and/or ROUTE receiver 210 may also handle packet repair failure. Eventually, it is possible that the packet repair attempt fails or is not completed in time. In this case, the multicast gateway may signal this issue to DASH client 212. There are two possibilities to address this situation:

1. The gateway breaks the transfer with, e.g., HTTP 504 code, and the DASH player is catered to handle such event.
2. Additionally or alternatively, a response is sent even if the packet is partially received using the partial file signaling mechanism as described above. According to this mechanism, the application indicates its capability to accept partial files in its HTTP GET request. The partial response includes the byte ranges of the correctly received object as well as resync points on byte stream level.

DASH client 212 and/or ROUTE receiver 210 may also handle transport object loss. One mechanism to handle the complete loss of one or more transport objects and their associated metadata (e.g., FDT) is to rely on the availability of a unicast connection. The multicast gateway may be configured as an HTTP reverse proxy, and may use the unicast connection to fetch the lost objects, for example, when the request to that object is made by the player. The gateway may use the URL of the requested object and the signaling of the unicast content location as discussed above to recover the same content via unicast.

Figure 6:
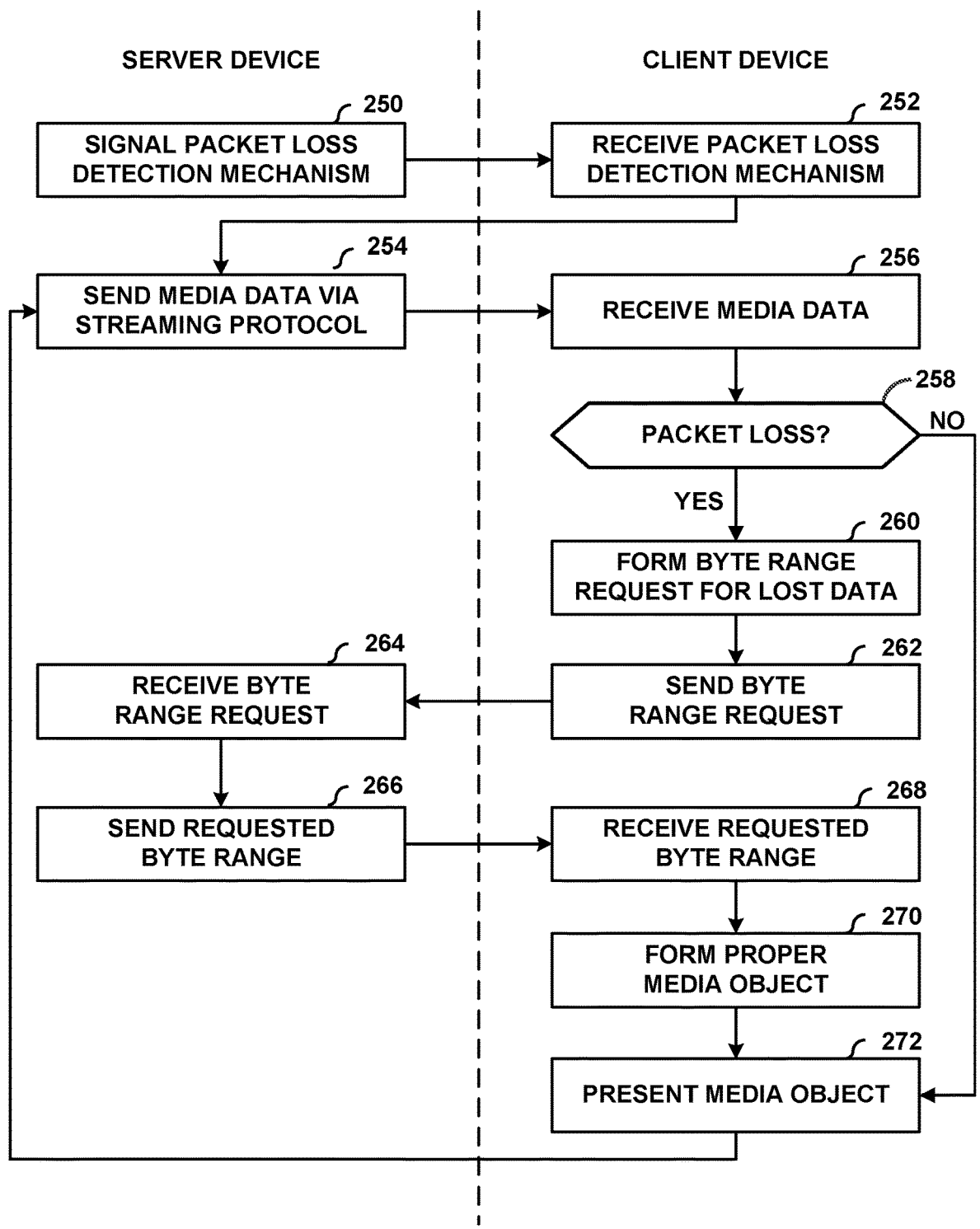
FIG. 6 is a flowchart illustrating an example method according to the techniques of this disclosure.

FIG. 6 is a flowchart illustrating an example method according to the techniques of this disclosure. The method of FIG. 6 is explained with respect to server device 60 and client device 40 of FIG. 1. Other devices may be configured to perform this or a similar method, such as the sender and receiver devices of FIG. 5.

Initially, server device 60 signals one or more packet loss detection mechanisms (250). These mechanisms may include one or more of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header. Client device 40 may also receive the signaled data representing the packet loss detection mechanisms (252).

Server device 60 may also send media data via a streaming protocol (254). For example, server device 60 may send the media data via FLUTE, ROUTE, or other network or over-the-air (OTA) broadcast standards, such as DVB. Client device 40 may then receive at least some of the media data (256). Client device 40 may further determine whether one or more packets have been lost using the packet loss detection mechanism(s) (258). If no packets have been lost ("NO" branch of 258), client device 40 may proceed to present a media object (272), e.g., audio and/or video data.

On the other hand, if at least one packet has been lost ("YES" branch of 258), client device 40 may determine media data that was included in the lost packet, and a corresponding position of the media data of the packet in a segment. For example, client device 40 may use a transport object identifier (TOI) and a start_offset to determine a starting byte position of the media data in the segment. Client device 40 may further determine an ending byte position of the media data of the lost packet using, e.g., a signaled chunk duration. Client device 40 may then form a byte range request for the lost media data (260) of the lost packet, such as an HTTP partial Get request specifying the byte range.

Client device 40 may then send the byte range request (262) to server device 60. In response to receiving the byte range request (264), server device 60 may send the requested byte range (266) to client device 40, e.g., according to a unicast protocol, such as HTTP. Client device 40 may then receive the requested byte range (268) and form a proper media object (270). Client device 40 may further present the media object (272).

In this manner, the method of FIG. 6 represents an example of a method of retrieving media data including receiving data indicating a packet loss signaling mechanism, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header; detecting loss of a packet using at least one of the packet loss signaling mechanisms, the lost packet including missing media data; generating a byte range request for the missing media data using information of the file delivery header; and delivering a proper media object to a media application.

The method of FIG. 6 also represents an example of a method of sending media data including sending data indicating a packet loss signaling mechanism, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header; sending one or more packets including media data via a broadcast or multicast protocol; receiving a byte range request via a unicast protocol from a client device indicating media data of one of the packets that is lost; and in response to the byte range request, sending the media data of the byte range to the client device via the unicast protocol.

Certain techniques of this disclosure are summarized in the following examples:

Example 1: A method of retrieving media data, the method comprising: receiving data indicating a packet loss signaling mechanism, the data comprising an indication of at least one of: that segments are sent in chunks, that TOIs are sequential, that a last packet of an object assigned to a TOI has a specific flag set in a header of the last packet, a base URL, a maximum latency, or a sync point in a file delivery header; detecting loss of a packet using at least one of the packet loss signaling mechanisms, the lost packet including missing media data; generating a byte range request for the missing media data using information of the file delivery header; and delivering a proper media object to a media application.

Example 2: The method of example 1, wherein the file delivery header comprises a ROUTE header or a FLUTE header.

Example 3: The method of any of examples 1 and 2, wherein the information of the file delivery header comprises a TOI and a start_offset value.

Example 4: The method of any of examples 1-3, wherein the proper media object is a partial media object missing at least some of the missing media data.

Example 5: The method of any of examples 1-4, wherein delivering the proper media object comprises delivering the proper media object by an expected delivery time for the media object.

Example 6: The method of any of examples 1-5, wherein detecting the loss of the packet comprises detecting the loss of the packet using a signaled inter-packet timeout.

Example 7: The method of example 6, wherein the inter-packet timeout is signaled according to a nominal CMAF chunk duration.

Example 8: The method of any of examples 6 and 7, further comprising determining chunk durations from a multicast transport packet header, multicast object metadata in a file delivery table (FDT) or enhanced FDT (EFDT), or in a control plane service or session metadata.

Example 9: The method of any of examples 6-8, further comprising determining whether chunk duration signaling takes account a maximum expected packet arrival jitter.

Example 10: The method of example 9, wherein when the chunk duration signaling does not take account of the maximum expected packet arrival jitter, determining the chunk duration signaling according to experienced packet reception jitter.

Example 11: The method of any of examples 6-10, wherein generating the byte range request comprises generating the byte range request after expiration of the inter-packet timeout.

Example 12: The method of any of examples 1-11, further comprising submitting the byte range request via a unicast protocol.

Example 13: The method of example 12, wherein the unicast protocol comprises HTTP.

Example 14: A device for retrieving media data, the device comprising one or more means for performing the method of any of examples 1-13.

Example 15: The device of example 14, wherein the one or more means comprise one or more processors implemented in circuitry.

Example 16: The device of example 14, wherein the device comprises at least one of: an integrated circuit; a microprocessor; or a wireless communication device.

Example 17: A computer-readable storage medium having stored thereon instructions that, when executed, cause a processor to perform the method of any of examples 1-13.

Example 18: A device for retrieving media data, the device comprising: means for receiving data indicating a packet loss signaling mechanism, the data comprising an indication of at least one of: that segments are sent in chunks, that TOIs are sequential, that a last packet of an object assigned to a TOI has a specific flag set in a header of the last packet, a base URL, a maximum latency, or a sync point in a file delivery header; means for detecting loss of a packet using at least one of the packet loss signaling mechanisms, the lost packet including missing media data; means for generating a byte range request for the missing media data using information of the file delivery header; and means for delivering a proper media object to a media application.

Example 19: A method of sending media data, the method comprising: sending data indicating a packet loss signaling mechanism, the data comprising an indication of at least one of: that segments are sent in chunks, that TOIs are sequential, that a last packet of an object assigned to a TOI has a specific flag set in a header of the last packet, a base URL, a maximum latency, or a sync point in a file delivery header; sending one or more packets including media data via a broadcast or multicast protocol; receiving a byte range request via a unicast protocol from a client device indicating media data of one of the packets that is lost; and in response to the byte range request, sending the media data of the byte range to the client device via the unicast protocol.

Example 20: A device for sending media data, the device comprising one or more means for performing the method of example 19.

Example 21: The device of example 20, wherein the device comprises at least one of: an integrated circuit; a microprocessor; or a wireless communication device.

Example 22: A computer-readable storage medium having stored thereon instructions that, when executed, cause a processor to perform the method of example 19.

Example 23: A device for sending media data, the device comprising: means for sending data indicating a packet loss signaling mechanism, the data comprising at least one of that segments are sent in chunks, that TOIs are sequential, that a last packet of an object assigned to a TOI has a specific flag set in a header of the last packet, a base URL, a maximum latency, or a sync point in a file delivery header; means for sending one or more packets including media data via a broadcast or multicast protocol; means for receiving a byte range request via a unicast protocol from a client device indicating media data of one of the packets that is lost; and means for sending, in response to the byte range request, the media data of the byte range to the client device via the unicast protocol.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
   receiving data indicating a packet loss signaling mechanism for a broadcast or multicast media streaming session, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header;
   receiving media data of the media streaming session according to a broadcast or multicast network protocol;
   detecting loss of a packet of the media streaming session using the at least one of the packet loss signaling mechanisms, the lost packet including missing media data;
   generating a byte range request for the missing media data using information of the file delivery header, the byte range request specifying a byte range of a segment corresponding to the missing media data;
   submitting the byte range request via a unicast protocol;
   receiving replacement media data for the missing media data in response to the byte range request; and
   delivering a proper media object to a media application, the proper media object including the received media data of the media streaming session and the replacement media data.

2. The method of claim 1, wherein detecting the loss of the packet comprises detecting the loss of the packet using a signaled inter-packet timeout value.

3. The method of claim 2, wherein the inter-packet timeout value is signaled according to a nominal common media application format (CMAF) chunk duration.

4. The method of claim 2, further comprising determining chunk durations from a multicast transport packet header, multicast object metadata in a file delivery table (FDT) or enhanced FDT (EFDT), or in a control plane service or session metadata.

5. The method of claim 2, further comprising determining whether chunk duration signaling takes account of a maximum expected packet arrival jitter.

6. The method of claim 5, wherein when the chunk duration signaling does not take account of the maximum expected packet arrival jitter, determining the chunk duration signaling according to experienced packet reception jitter.

7. The method of claim 6, wherein generating the byte range request comprises generating the byte range request after expiration of the inter-packet timeout value.

8. The method of claim 1, wherein the file delivery header comprises a ROUTE header or a FLUTE header.

9. The method of claim 1, wherein the information of the file delivery header comprises a TOI and a start_offset value.

10. The method of claim 1, wherein the proper media object is a partial media object missing at least some of the missing media data.

11. The method of claim 1, wherein delivering the proper media object comprises delivering the proper media object by an expected delivery time for the media object.

12. The method of claim 1, wherein the unicast protocol comprises HTTP.

13. A device for retrieving media data, the device comprising:
   a memory configured to store media data; and
   one or more processors implemented in circuitry and configured to:
      receive data indicating a packet loss signaling mechanism for a broadcast or multicast media streaming session, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header;
      receive media data of the media streaming session according to a broadcast or multicast network protocol;
      detect loss of a packet of the media streaming session using the at least one of the packet loss signaling mechanisms, the lost packet including missing media data;
      generate a byte range request for the missing media data using information of the file delivery header, the byte range request specifying a byte range of a segment corresponding to the missing media data;
      submit the byte range request via a unicast protocol;
      receive replacement media data for the missing media data in response to the byte range request; and
      deliver a proper media object to a media application, the proper media object including the received media data of the media streaming session and the replacement media data.

14. The device of claim 13, wherein the one or more processors are configured to detect the loss of the packet using a signaled inter-packet timeout value.

15. The device of claim 14, wherein the inter-packet timeout value is signaled according to a nominal common media application format (CMAF) chunk duration.

16. The device of claim 14, wherein the one or more processors are further configured to determine chunk durations from a multicast transport packet header, multicast object metadata in a file delivery table (FDT) or enhanced FDT (EFDT), or in a control plane service or session metadata.

17. The device of claim 14, wherein the one or more processors are further configured to determine whether chunk duration signaling takes account of a maximum expected packet arrival jitter.

18. The device of claim 13, wherein the file delivery header comprises a ROUTE header or a FLUTE header.

19. The device of claim 13, wherein the information of the file delivery header comprises a TOI and a start_offset value.

20. The device of claim 13, wherein the device comprises at least one of:
an integrated circuit;
a microprocessor; or
a wireless communication device.

21. A computer-readable storage medium having stored thereon instructions that, when executed, cause a processor to:
receive data indicating a packet loss signaling mechanism for a broadcast or multicast media streaming session, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header;
receive media data of the media streaming session according to a broadcast or multicast network protocol;
detect loss of a packet of the media streaming session using the at least one of the packet loss signaling mechanisms, the lost packet including missing media data;
generate a byte range request for the missing media data using information of the file delivery header, the byte range request specifying a byte range of a segment corresponding to the missing media data;
submit the byte range request via a unicast protocol;
receive replacement media data for the missing media data in response to the byte range request; and
deliver a proper media object to a media application, the proper media object including the received media data of the media streaming session and the replacement media data.

22. A device for retrieving media data, the device comprising:
means for receiving data indicating a packet loss signaling mechanism for a broadcast or multicast media streaming session, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header;
means for receiving media data of the media streaming session according to a broadcast or multicast network protocol;
means for detecting loss of a packet of the media streaming session using the at least one of the packet loss signaling mechanisms, the lost packet including missing media data;
means for generating a byte range request for the missing media data using information of the file delivery header, the byte range request specifying a byte range of a segment corresponding to the missing media data;
means for submitting the byte range request via a unicast protocol;
means for receiving replacement media data for the missing media data in response to the byte range request; and
means for delivering a proper media object to a media application, the proper media object including the received media data of the media streaming session and the replacement media data.

23. A method of sending media data, the method comprising:
sending data indicating a packet loss signaling mechanism for a broadcast or multicast media streaming session, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header;
sending one or more packets including media data of the media streaming session via a broadcast or multicast protocol;
receiving a byte range request via a unicast protocol from a client device indicating media data of one of the packets that is lost, the byte range request specifying a byte range of a segment corresponding to the media data of the one of the packets that is lost; and
in response to the byte range request, sending the media data of the byte range to the client device via the unicast protocol.

24. The method of claim 23, wherein sending the data indicating the packet loss signaling method further comprises sending data representing an inter-packet timeout value.

25. The method of claim 24, wherein sending the data representing the inter-packet timeout value comprises signaling the inter-packet timeout value according to a nominal common media application format (CMAF) chunk duration.

26. The method of claim 24, further comprising signaling data representing chunk durations in a multicast transport packet header, multicast object metadata in a file delivery table (FDT) or enhanced FDT (EFDT), or in a control plane service or session metadata.

27. The method of claim 23, wherein the file delivery header comprises a ROUTE header or a FLUTE header.

28. The method of claim 23, wherein the information of the file delivery header comprises a TOI and a start_offset value.

29. The method of claim 23, wherein the unicast protocol comprises HTTP.

30. A device for sending media data, the device comprising:
a memory configured to store video data; and
one or more processors implemented in circuitry and configured to:
send data indicating a packet loss signaling mechanism for a broadcast or multicast media streaming session, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header;

send one or more packets including media data of the media streaming session via a broadcast or multicast protocol;

receive a byte range request via a unicast protocol from a client device indicating media data of one of the packets that is lost, the byte range request specifying a byte range of a segment corresponding to the media data of the one of the packets that is lost; and in response to the byte range request, send the media data of the byte range to the client device via the unicast protocol.

31. The device of claim 30, wherein the one or more processors are further configured to send data representing an inter-packet timeout value.

32. The device of claim 31, wherein the one or more processors are configured to signal the inter-packet timeout value according to a nominal common media application format (CMAF) chunk duration.

33. The device of claim 31, wherein the one or more processors are further configured to signal data representing chunk durations in a multicast transport packet header, multicast object metadata in a file delivery table (FDT) or enhanced FDT (EFDT), or in a control plane service or session metadata.

34. The device of claim 30, wherein the file delivery header comprises a ROUTE header or a FLUTE header.

35. The device of claim 30, wherein the information of the file delivery header comprises a TOI and a start_offset value.

36. The device of claim 30, wherein the unicast protocol comprises HTTP.

37. The device of claim 30, wherein the device comprises at least one of:
an integrated circuit;
a microprocessor; or
a wireless communication device.

38. A computer-readable storage medium having stored thereon instructions that, when executed, cause a processor to:
send data indicating a packet loss signaling mechanism for a broadcast or multicast media streaming session, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header;

send one or more packets including media data of the media streaming session via a broadcast or multicast protocol;

receive a byte range request via a unicast protocol from a client device indicating media data of one of the packets that is lost, the byte range request specifying a byte range of a segment corresponding to the media data of the one of the packets that is lost; and in response to the byte range request, send the media data of the byte range to the client device via the unicast protocol.

39. A device for sending media data, the device comprising:
means for sending data indicating a packet loss signaling mechanism for a broadcast or multicast media streaming session, the packet loss signaling mechanism comprising at least one of that segments are sent in chunks, that transport object identifiers (TOIs) are sequential, or that a last packet of an object assigned to a TOI has a specific flag set in a header of the last packet, a base URL, a maximum latency, or a synchronization point in a file delivery header;

means for sending one or more packets including media data of the media streaming session via a broadcast or multicast protocol;

means for receiving a byte range request via a unicast protocol from a client device indicating media data of one of the packets that is lost, the byte range request specifying a byte range of a segment corresponding to the media data of the one of the packets that is lost; and means for sending, in response to the byte range request, the media data of the byte range to the client device via the unicast protocol.

* * * * *